United States Patent
Takano

(10) Patent No.: US 9,960,722 B2
(45) Date of Patent: May 1, 2018

(54) MOTOR CONTROLLER

(71) Applicant: Nidec Corporation, Kyoto (JP)

(72) Inventor: Yuichi Takano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days. days.

(21) Appl. No.: 14/933,361

(22) Filed: Nov. 5, 2015

(65) Prior Publication Data
US 2016/0190967 A1 Jun. 30, 2016

(30) Foreign Application Priority Data

Dec. 26, 2014 (JP) .................. 2014-265578

(51) Int. Cl.
*H02P 25/08* (2016.01)
*H02P 21/14* (2016.01)
*H02P 25/086* (2016.01)

(52) U.S. Cl.
CPC ............ *H02P 25/08* (2013.01); *H02P 21/148* (2013.01); *H02P 25/086* (2013.01)

(58) Field of Classification Search
CPC .......... H02P 21/24; H02P 21/14; H02P 25/08; H02P 27/08
IPC ....................................... H02P 25/08
See application file for complete search history.

(56) References Cited

U.S. PATENT DOCUMENTS

| | | | |
|---|---|---|---|
| 5,703,457 A | 12/1997 | Davis | |
| 2003/0111975 A1* | 6/2003 | Slater | H02P 25/089 318/701 |
| 2009/0026988 A1* | 1/2009 | Tomigashi | H02P 21/10 318/400.02 |
| 2010/0051368 A1* | 3/2010 | Donnelly | B60L 15/2045 180/65.285 |
| 2012/0081054 A1* | 4/2012 | Hisada | H02P 25/24 318/400.41 |
| 2013/0069577 A1 | 3/2013 | Lee et al. | |
| 2014/0354196 A1 | 12/2014 | Ahmad | |
| 2015/0349679 A1* | 12/2015 | Rogers | H02P 6/08 318/400.3 |

FOREIGN PATENT DOCUMENTS

| | | |
|---|---|---|
| JP | 2003-189669 A | 7/2003 |
| JP | 2011135762 A * | 7/2011 |
| WO | 2011/065406 A1 | 6/2011 |
| WO | 2013/105506 A1 | 7/2013 |

* cited by examiner

*Primary Examiner* — Eduardo Colon Santana
*Assistant Examiner* — Said Bouziane
(74) *Attorney, Agent, or Firm* — Keating & Bennett, LLP

(57) ABSTRACT

A motor controller which controls a switched reluctance motor (hereinafter referred to as a motor) includes an inverter, a torque computation part, a magnetic flux computation part, and a switching control unit. The switching control unit controls the inverter by using at least a reference torque, which is a torque command value, and a calculated torque. The switching control unit includes a minimum magnetic flux maintenance part. The minimum magnetic flux maintenance part controls the inverter such that a calculated phase magnetic flux of each phase becomes equal to or larger than a predetermined minimum value in a state where the rotational speed of the motor is above a predetermined speed.

2 Claims, 12 Drawing Sheets

MOTOR CONTROLLER

BACKGROUND OF THE INVENTION

1. Field of the Invention

The present invention relates to a motor controller which controls a switched reluctance motor.

2. Description of the Related Art

The switched reluctance motor (hereinafter referred to as an SRM) is gaining attention for its low manufacturing cost and simple yet robust structure. The rising price of rare-earth elements is also contributing to the popularity of the SRM which requires no rare-earth permanent magnet. In the SRM, torque is obtained by applying a current to the stator winding while the inductance is changing.

In the SRM, regardless of its control method, the variation width of a magnetic flux becomes smaller during high-speed rotation, which results in a torque decrease. One example of a method for suppressing torque decrease is a control method disclosed in Japanese Patent Laid-Open No. 2003-189669, which involves a continuous current mode (hereinafter referred to as a CCM).

In the CCM, the phase windings are energized before the magnetic flux and the current return to zero at the end of the energy return period. The phase windings are always linked by the magnetic flux caused by the current continuously flowing through them. To realize the CCM, the electrical angle at which the phase windings are excited is enlarged. Accordingly, the magnitudes of the current and the magnetic flux are raised, so that these do not return to zero. That is, the next excitation occurs before the current becomes zero. As a result, even during high-speed rotation, a constant variation width of the magnetic flux is maintained and torque decrease is prevented.

In the CCM, it is necessary to acquire the accurate rotational position of the rotor in order to enlarge the electrical angle at which the phase windings are excited. If there is a gap between the acquired rotational position and the actual rotational position of the rotor, excitation fails to be started at a proper timing, so that no ideal continuous current flows and the motor efficiency degrades.

SUMMARY OF THE INVENTION

A motor controller according to one preferable preferred embodiment of the present disclosure includes an inverter, a torque computation part, a magnetic flux computation part, and a switching control unit.

The inverter is connected with a three-phase concentrated winding switched reluctance motor. The torque computation part estimates or measures, as a calculated torque, a torque generated in the switched reluctance motor on the basis of an output from the inverter and a rotor angle of the switched reluctance motor.

The magnetic flux computation part estimates or measures, as a calculated phase magnetic flux, a phase magnetic flux of each phase generated in the switched reluctance motor on the basis of the output from the inverter and the rotor angle of the switched reluctance motor.

The switching control unit controls the inverter by using at least a reference torque, which is a torque command value, and the calculated torque.

The switching control unit includes a minimum magnetic flux maintenance part. The minimum magnetic flux maintenance part controls the inverter such that the calculated phase magnetic flux of each phase becomes equal to or larger than a predetermined minimum value in a state where a rotational speed of the switched reluctance motor is above a predetermined speed.

According to the present disclosure, switched reluctance motors can be controlled properly in the continuous current mode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
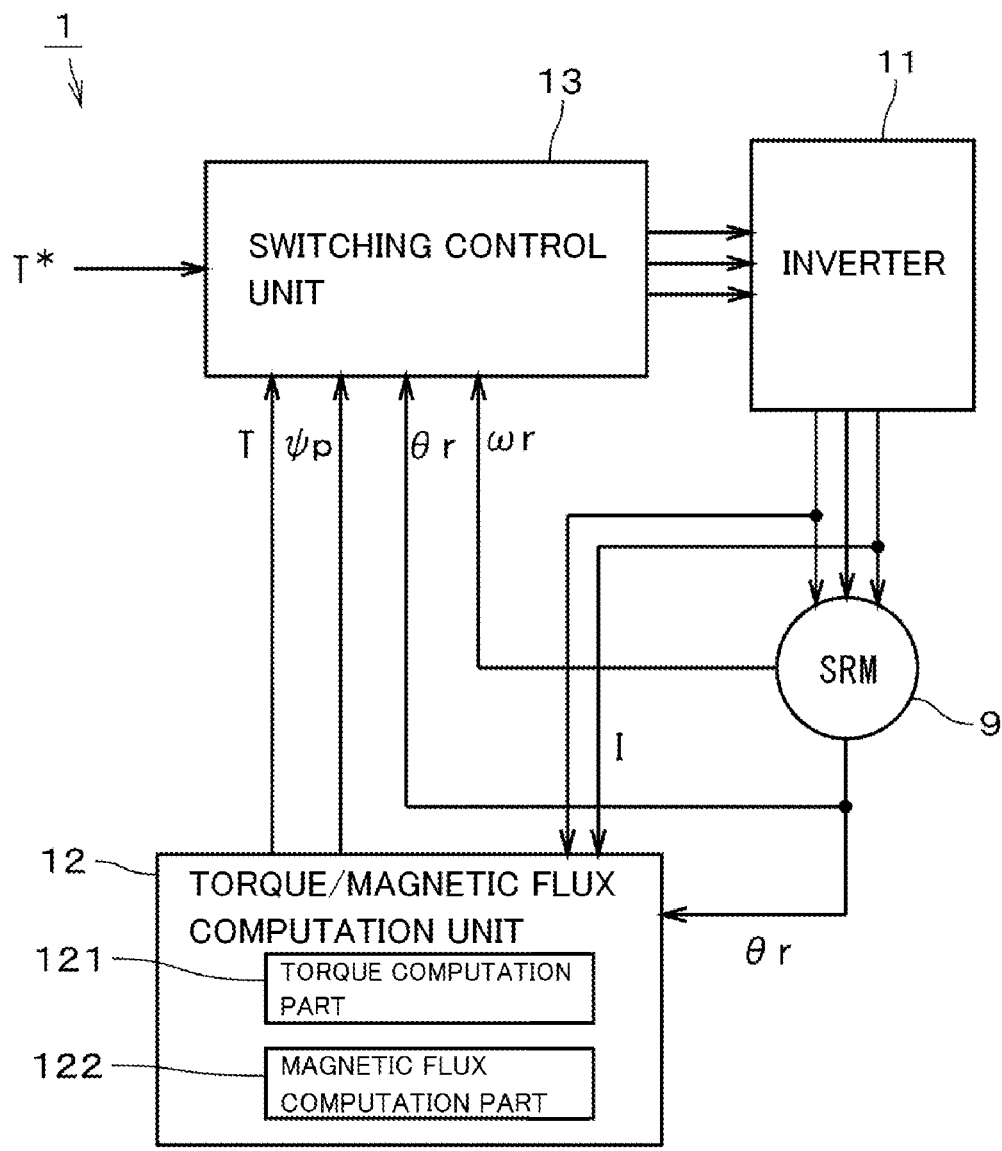
FIG. 1 is a block diagram showing the configuration of a motor controller.

FIG. 1 is a block diagram showing the configuration of a motor controller 1. The motor controller 1 controls a switched reluctance motor (SRM) 9.

Figure 2:
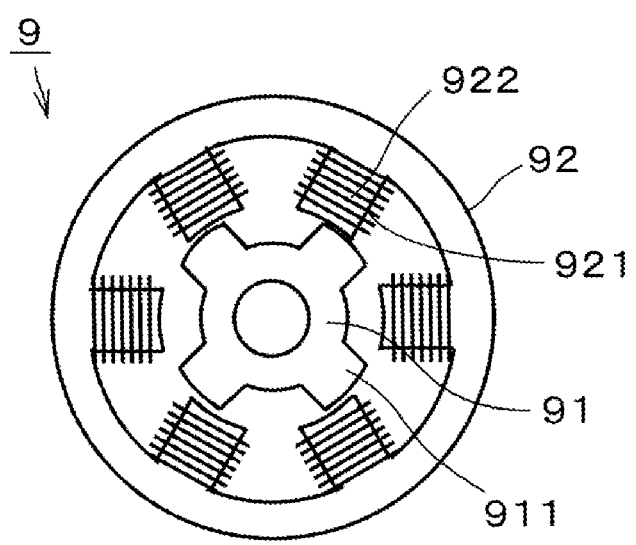
FIG. 2 is a schematic view of an SRM.

FIG. 2 is a schematic view of the SRM 9. The SRM 9 includes a rotor 91 and a stator 92. The rotor 91 is supported by a bearing mechanism (not shown) so as to be rotatable around the rotation axis relative to the stator 92. The rotor 91 includes a plurality of protrusions 911 protruding toward the stator 92. The stator 92 includes a plurality of protrusions 921 protruding toward the rotor 91. In other words, the SRM 9 has a double salient pole structure. A conductive wire is wound around each protrusion 921 of the stator 92 to form a coil 922. The coils 922 of the SRM 9 are a three-phase concentrated winding. The rotor 91 is provided with no coils nor permanent magnets. Torque is generated as a switching current is supplied while the inductance of the phase windings, i.e., the coils 922, is changing.

As shown in FIG. 1, the motor controller 1 includes an inverter 11, a torque/magnetic flux computation unit 12, and a switching control unit 13. A rotor angle θr, which indicates the rotational position of the rotor 91 of the SRM 9, and a value of a current I output from the inverter 11 are input into the torque/magnetic flux computation unit 12. The torque/magnetic flux computation unit 12 includes a torque computation part 121 and a magnetic flux computation part 122. The torque computation part 121 estimates or accurately obtains a torque generated in the SRM 9 by computation on the basis of the output from the inverter 11 and the rotor angle θr. The magnetic flux computation part 122 estimates or accurately obtains a magnetic flux of each phase generated in the SRM 9 by computation on the basis of the output from the inverter 11 and the rotor angle θr.

Hereinafter, the torque obtained by the torque/magnetic flux computation unit 12 will be referred to as a calculated torque T, and the magnetic fluxes of the phases ψa, ψb, ψc will be referred to as a calculated phase magnetic flux ψp. That is, the torque computation part 121 estimates or measures the calculated torque T. The magnetic flux computation part 122 estimates or measures the calculated phase magnetic flux ψp. The switching control unit 13 controls switching in the inverter 11 on the basis of the values input from the SRM 9 and the torque/magnetic flux computation unit 12, as well as of a reference torque T* which is a torque command value. The torque computation part 121 estimates or measures the torque generated in the SRM 9 as the calculated torque T on the basis of the output from the inverter 11 and the rotor angle θr. The magnetic flux computation part 122 estimates or measures the phase magnetic flux of each phase generated in the SRM 9 as the calculated phase magnetic flux ψp on the basis of the output from the inverter 11 and the rotor angle θr. The switching control unit 13 controls the inverter 11 by using at least the reference torque T*, which is a torque command value, and the calculated torque T.

Figure 3:
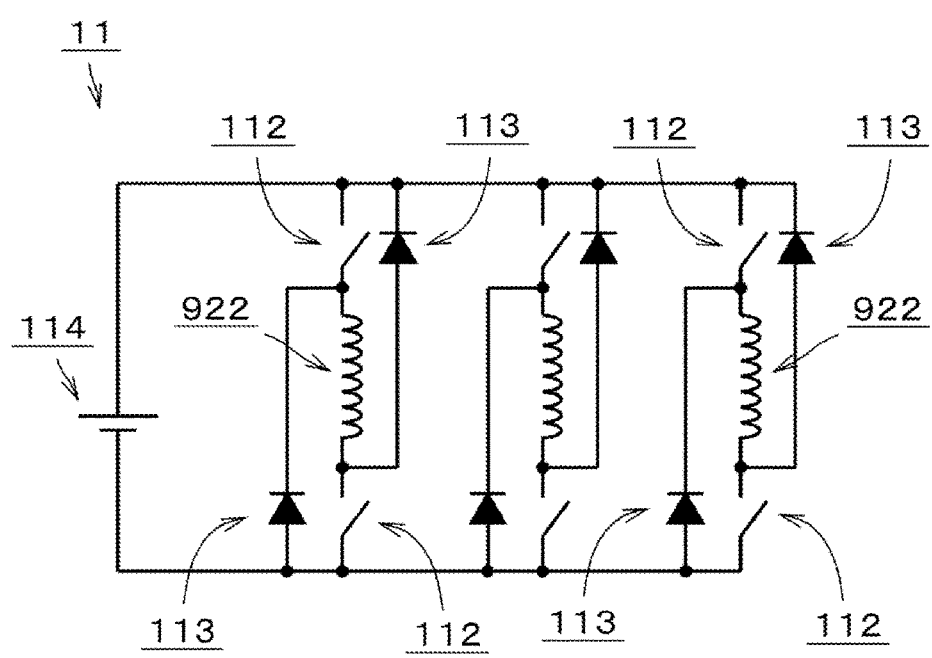
FIG. 3 is a view showing the configuration of an inverter.

FIG. 3 is a view showing the configuration of the inverter 11 connected with the SRM 9. The inverter is connected with the three-phase concentrated winding SRM 9. The inverter 11 is preferably a three-phase asymmetric half-bridge inverter including six switching elements. The inverter 11 includes three pairs of switching elements 112 and three pairs of diodes 113 corresponding respectively to the three phase coils 922. That is, one pair of switching elements 112 and one pair of diodes 113 are provided for one phase coil 922. To be precise, the one phase coil 922 is a coil group of the phase.

One of each pair of switching elements 112 is disposed between the positive pole of a DC power source 114 and one end of the coil 922. The other of each pair of switching elements 112 is disposed between the negative pole of the DC power source 114 and the other end of the coil 922. Hereinafter, the switching element 112 on the positive-pole side will be referred to as an upper switching element. The switching element 112 on the negative-pole side will be referred to as a lower switching element. One of each pair of diodes 113 is disposed between the positive-pole of the power source 114 and a point between the coil 922 and the lower switching element 112, and blocks a current flowing from the positive pole toward the negative pole. The other of each pair of diodes 113 is disposed between the negative-pole of the power source 114 and a point between the coil 922 and the upper switching element 112, and blocks a current flowing from the positive pole toward the negative pole.

Figure 4:
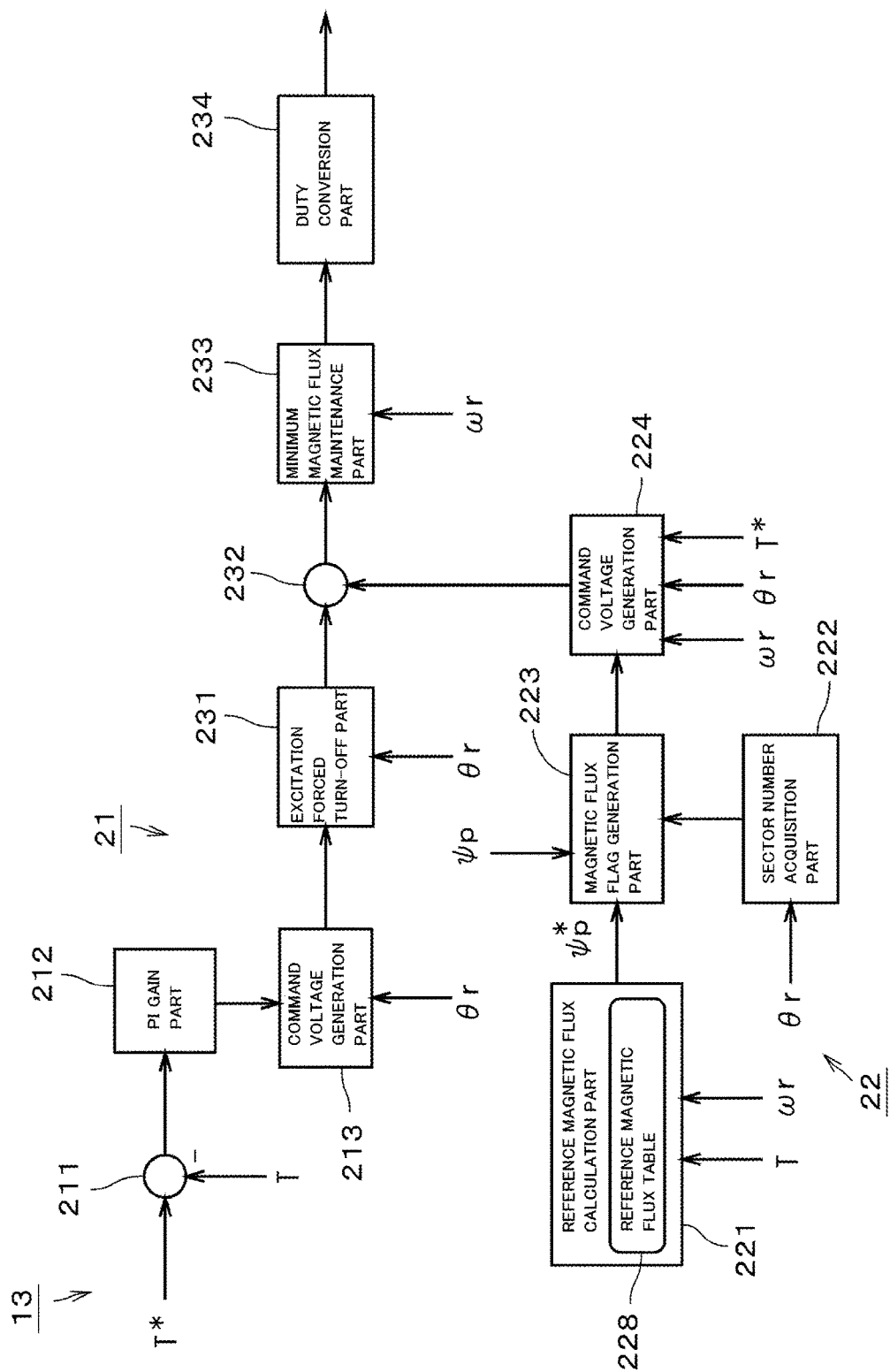
FIG. 4 is a block diagram showing the configuration of a switching control unit.

FIG. 4 is a view showing the configuration of the switching control unit 13 corresponding to one phase. The switching control unit 13 includes a feedback computation part 21, a feedforward computation part 22, a part for forcibly turning off excitation (hereinafter referred to as an excitation forced turn-off part) 231, an adder 232, a minimum magnetic flux maintenance part 233, and a duty conversion part 234. The feedback computation part 21 includes a torque differentiator 211, a PI gain part 212, and a command voltage generation part 213. The feedforward computation part 22 includes a reference magnetic flux calculation part 221, a sector number acquisition part 222, a magnetic flux flag generation part 223, and a command voltage generation part 224.

First, control in a case where the functions of the excitation forced turn-off part 231, the minimum magnetic flux maintenance part 233, and the feedforward computation part 22 are excluded will be described. The reference torque T*, which is a command torque, and the calculated torque T are input into the torque differentiator 211 of the feedback computation part 21. The torque differentiator 211 obtains a (signed) difference between the reference torque T* and the calculated torque T. This difference is multiplied by a PI gain in the PI gain part 212. The value from the PI gain part 212 is input into the command voltage generation part 213.

The command voltage generation part 213 generates a command voltage of a corresponding phase on the basis of the value from the PI gain part 212 and the rotor angle θr. The rotor angle θr is the rotational angle of the rotor 91 from a predetermined position. In practice, the torque differentiator 211 and the PI gain part 212 are provided to be shared by all the phases, while other components are provided for each phase. The command voltage is input into the adder 232 via the excitation forced turn-off part 231.

When the excitation forced turn-off part 231, the minimum magnetic flux maintenance part 233, and the feedforward computation part 22 are not considered, the value of the command voltage from the command voltage generation part 213 indicating (−100)% to (+100)% is converted by the duty conversion part 234 into a switching signal. By controlling the inverter 11 according to the switching signal, feedback control is realized which reduces the difference between the calculated torque T and the reference torque T*. The feedback control and the duty ratio control in combination allow even an SRM to be controlled with little torque ripple. Moreover, a motor controller suitable for mass-production is realized, since the use of the calculated torque T makes it less susceptible to manufacturing error among individual motors.

Next, feedforward control will be described. The calculated torque T and a rotational speed ωr of the SRM 9 are input into the reference magnetic flux calculation part 221 of the feedforward computation part 22. The reference magnetic flux calculation part 221 includes a reference magnetic flux table 228. The reference magnetic flux table 228 stores in advance a reference phase magnetic flux ψp* corresponding to the calculated torque T and the rotational speed ωr. The symbol ψp* represents one of the three reference phase magnetic fluxes ψa*, ψb*, and ψc*. The reference magnetic flux calculation part 221 acquires the reference phase magnetic flux ψp* with reference to the calculated torque T and the rotational speed ωr. The reference phase magnetic flux ψp* is input into the magnetic flux flag generation part 223. In the reference magnetic flux calculation part 221, the reference torque T* may be used instead of the calculated torque T.

A rotor angle θr is input from the SRM 9 into the sector number acquisition part 222. The sector number is a number indicating a region of an electrical angle, which indicates the rotational position of the rotor 91, divided into six equal parts. Hereinafter, these regions will be referred to as sectors. While the position of the leading end of each sector is basically the center position of the protrusion 921 of the stator 92, this position may be adjusted appropriately. The sector number and the calculated phase magnetic flux ψp are input into the magnetic flux flag generation part 223.

Figure 5:
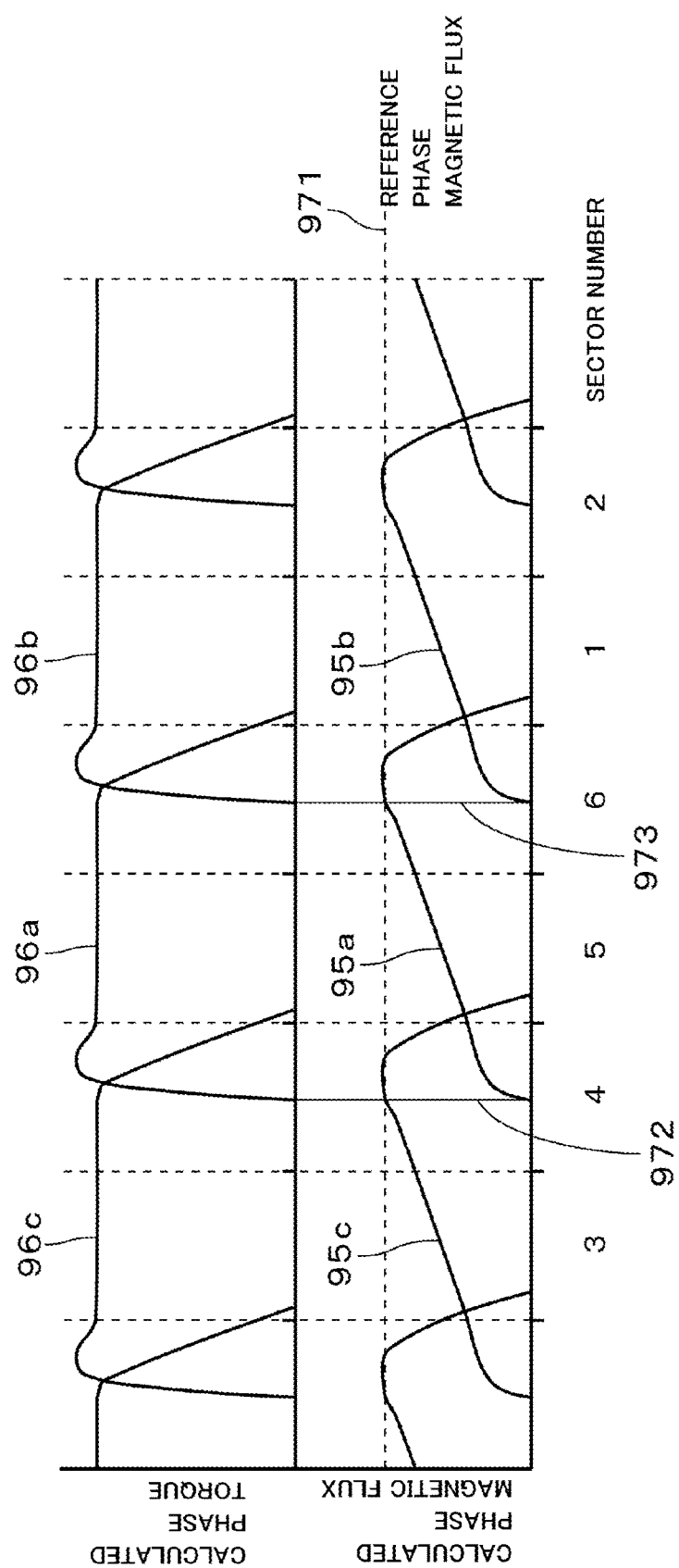
FIG. 5 is a view illustrating the operation of a magnetic flux flag generation part.

FIG. 5 is a view illustrating the operation of the magnetic flux flag generation part 223. Table 1 shows sector commands used when generating a magnetic flux flag.

TABLE 1

|  | Sector Number | | | | | |
|---|---|---|---|---|---|---|
|  | 1 | 2 | 3 | 4 | 5 | 6 |
| Phase A | — | — | — | Up | Keep | Down |
| Phase B | Keep | Down | — | — | — | Up |
| Phase C | — | Up | Keep | Down | — | — |

As shown in Table 1, for each phase, sector commands "Up", "Keep", and "Down" are set according to the sector number. For example, in phase A, "Up" is set for the sector of the sector number 4. Hereinafter, with N being an integer from 1 to 6, a sector of the sector number N will be referred to as sector N. "Keep" is set for sector 5, and "Down" is set for sector 6. No sector commands are set for sectors 1 to 3. Similarly, in phase B, "Up", "Keep", and "Down" are set for sector 6, sector 1, and sector 2, respectively. No sector commands are set for the other sectors. In phase C, "Up", "Keep", and "Down" are set for sector 2, sector 3, and sector 4, respectively. No sector commands are set for the other sectors.

In FIG. 5, a line 95a indicating a calculated phase magnetic flux corresponds to phase A of Table 1. In the following description, the reference signs given to the lines will be given to the calculated phase magnetic fluxes. A calculated phase magnetic flux 95b corresponds to phase B. A calculated phase magnetic flux 95c corresponds to phase C. A line 96a indicating a calculated phase torque corresponds to phase A. In the following description, the reference signs given to the lines will be given to the calculated phase torques. A calculated phase torque 96b corresponds to phase B. A calculated phase torque 96c corresponds to phase C. The straight line denoted by the reference sign 971 indicates the reference phase magnetic flux obtained by the reference magnetic flux calculation part 221.

Table 2 illustrates the operation of the command voltage generation part 224. In the command voltage generation part 224, a command voltage, which indicates a command value to be output based on the reference torque T*, the rotational speed ωr, and the rotor angle θr, is prepared in advance as a table or a function. Instead of the rotational speed ωr, a reference rotational speed ωr* which is a command speed may be used. The magnetic flux flag generation part 223 outputs a magnetic flux flag indicating "1" in an initial state. In this state, the magnetic flux flag generation part 223 performs one-phase excitation on the SRM 9 with reference to the table or the function. Specifically, the magnetic flux flag generation part 223 performs excitation on only those phases for which the sector command "Keep" or "Down" is set. If "Up" is set, a voltage is applied to the diode of the inverter 11 in a reverse direction, and no excitation is performed.

TABLE 2

| Magnetic | Sector command | | |
|---|---|---|---|
| flux flag | Up | Keep | Down |
| 1 | No excitation | One-phase excitation | One-phase excitation |
| 1 → 0 | Two-phase | | Two-phase |

TABLE 2-continued

| Magnetic | Sector command | | |
|---|---|---|---|
| flux flag | Up | Keep | Down |
|  | excitation build-up |  | excitation fall |

More specifically, if "Up" is set, the upper and lower switching elements 112 of FIG. 3 are turned off, so that basically no current flows through the coil 922. If "Keep" is set, the upper and lower switching elements 112 are turned on according to the command voltage which indicates a duty ratio of (+100)% equivalent to build-up, so that the current and the torque build up. That is, excitation builds up. Then, with the lower switching element 112 turned on, the upper switching element 112 is switched on/off according to the positive duty ratio indicated by the command voltage, so that voltage application and freewheeling are switched to maintain the current and the torque. That is, excitation is maintained. For example, if the duty ratio is (+40)%, the ratio of the turn-on time of the upper switching element 112 is 40%.

If "Down" is set, with the upper switching element 112 turned off, the lower switching element 112 is switched on/off according to a value obtained by subtracting the absolute value of the negative duty ratio, indicated by the command voltage, from 100%, so that freewheeling and regeneration are switched. For example, if the duty ratio is (−40)%, the ratio of the turn-on time of the lower switching element 112 is 60%. Thus, the current and the torque decrease to zero, and excitation falls. When the command voltage indicates (−100)%, the upper and lower switching elements 112 are turned off, so that excitation falls rapidly.

If the configuration of FIG. 4 is one corresponding to phase A, for example, the magnetic flux flag generation part 223 takes particular note of phase C with "Down" in sector 4. When the value of the reference torque increases, if the calculated phase magnetic flux 95c of phase C exceeds the reference phase magnetic flux at the time indicated by the reference sign 972, the magnetic flux flag generation part 223 changes the magnetic flux flag to "0". The magnetic flux, which has been changed to "0", is maintained until sector 4 ends.

In the command voltage generation part 224 of phase A, if the magnetic flux flag "0" is input, since "Up" is set for phase A, the command voltage for phase A is set to (+100)% and excitation builds up. In phase C for which "Down" is set, excitation falls according to the duty ratio indicated by the command voltage. As a result, as indicated by the reference signs 95c, 95a, 96c, 96a, two-phase excitation of phase C and phase A is performed for some time from the time 972, and sufficient torque is output. In the next sector, excitation is maintained in phase A as with one-phase excitation, and in the following sector, fall in phase A and build-up in phase B occur simultaneously.

In other words, when the calculated phase magnetic flux of one phase exceeds the reference phase magnetic flux, the feedforward computation part 22 starts excitation of the next phase, and acquires a computation result in which excitation of the one phase and excitation of the next phase overlap partially with each other. At the time 973 of FIG. 5, two-phase excitation of phase A and phase B is similarly started.

In the adder 232, the command voltage input from the command voltage generation part 213 via the excitation forced turn-off part 231 and the command voltage from the command voltage generation part 224 are added. Being limited to (−100)% at the minimum and to (+100)% at the maximum, the command voltage obtained by addition assumes a value within the range from (−100)% to (+100)%. The value obtained by addition is input into the inverter 11 via the minimum magnetic flux maintenance part 233 and the duty conversion part 234. Thus, the feedback control and the feedforward control according to the reference torque T* are realized.

In the case where only the feedback control is performed, the reference torque, which is a torque command value, and the calculated torque are used to control the inverter 11. In the case where the feedforward control is performed along with the feedback control, the reference phase magnetic flux, which is a phase magnetic flux command value, and the calculated phase magnetic flux are additionally used to control the inverter 11. Alternatively, the feedforward control may be performed alone without the feedback control.

Next, the duty conversion part 234 will be described. For example, in hysteresis control which is adopted for direct torque control (DTC), switching in the inverter 11 is performed during each sampling period. By contrast, in the motor controller 1, the duty conversion part 234 determines the turn-on time in one sampling period according to the command voltage. That is, the switching control unit 13 acquires the time width of a pulse by using the computation result of the feedback computation part 21 and the computation result of the feedforward computation part 22, or by using either of these computation results. As a result, the pulse width per sampling period of voltage applied to the SRM 9 by the inverter 11 is changed.

Figure 6:
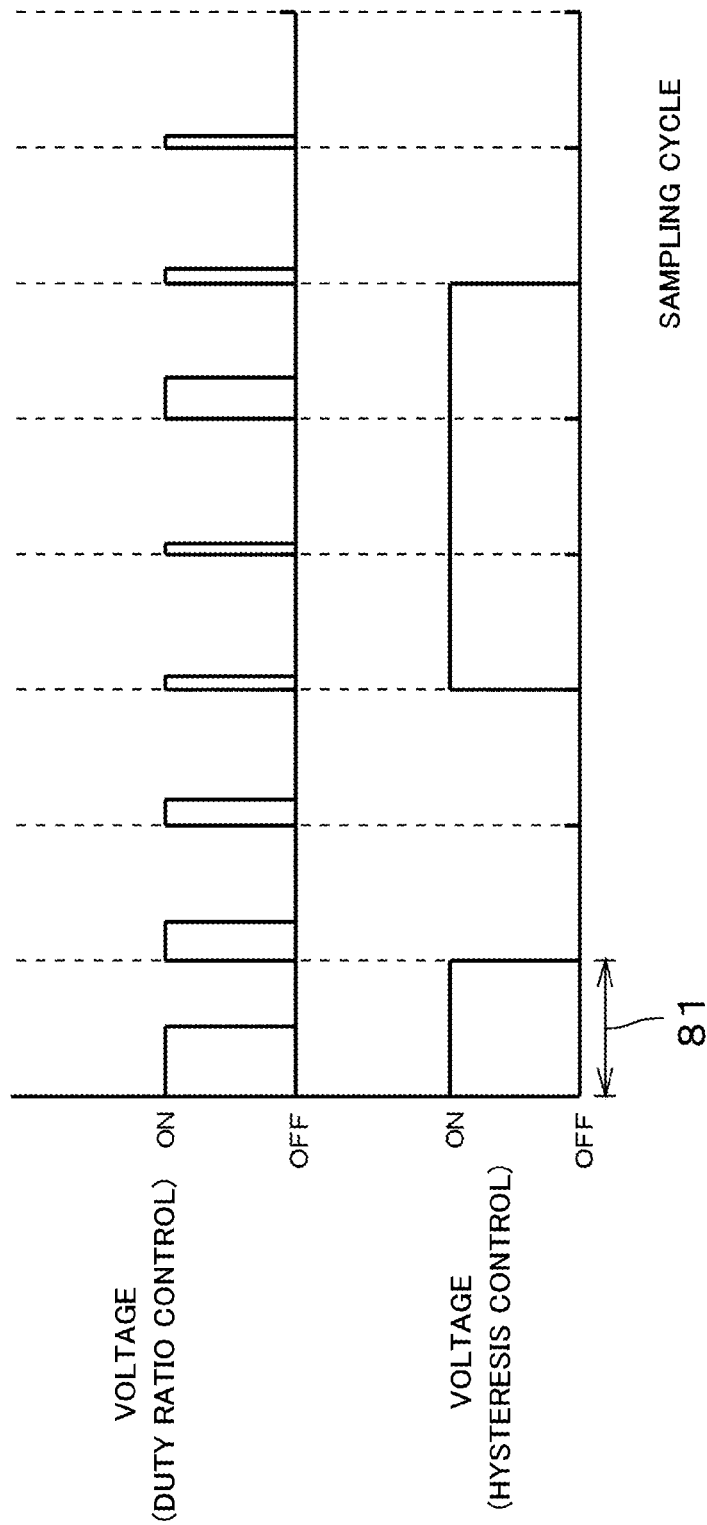
FIG. 6 is a view showing one example of duty ratio control in contrast with hysteresis control.

FIG. 6 is a view showing one example of the duty ratio control by the duty conversion part 234 in contrast with the hysteresis control. The abscissa axis indicates a sampling cycle which is repetition of a sampling period 81. In the duty conversion part 234, the on-state and the off-state are switched as necessary for each phase during one sampling period 81, and the on-state is maintained for the time of the duty ratio and a voltage is applied to the coil 922 corresponding to the phase. During the turn-off time, the coil 922 remains in a freewheeling state. FIG. 6 shows the on and off states in the case where the duty ratio is positive. When the duty ratio is negative, regeneration is performed at the rate of the absolute value of the duty ratio in one sampling period 81.

By contrast, in the hysteresis control of DTC, for example, a calculated torque and a reference torque are input into a hysteresis comparator, and an on-state or an off-state is maintained throughout one sampling period. As a result, the output torque varies significantly from the reference torque. Of course, more proper control is realized if the sampling period is reduced. However, reduction of the sampling period leads to a cost increase in the case of the DTC which involves advanced computation. On the other hand, if the hysteresis width is set to a smaller width, the switching frequency increases and the susceptibility to disturbance increases.

In the duty ratio control by the motor controller 1, since the on-state and the off-state are switched as necessary during one sampling period, the motor can be controlled so as to bring the output torque closer to the reference torque. Moreover, the simplified computation process allows reduction of the manufacturing cost of the motor controller. In addition, torque ripple is also reduced. As a result, a motor controller suitable for mass-production is realized.

Figure 7:
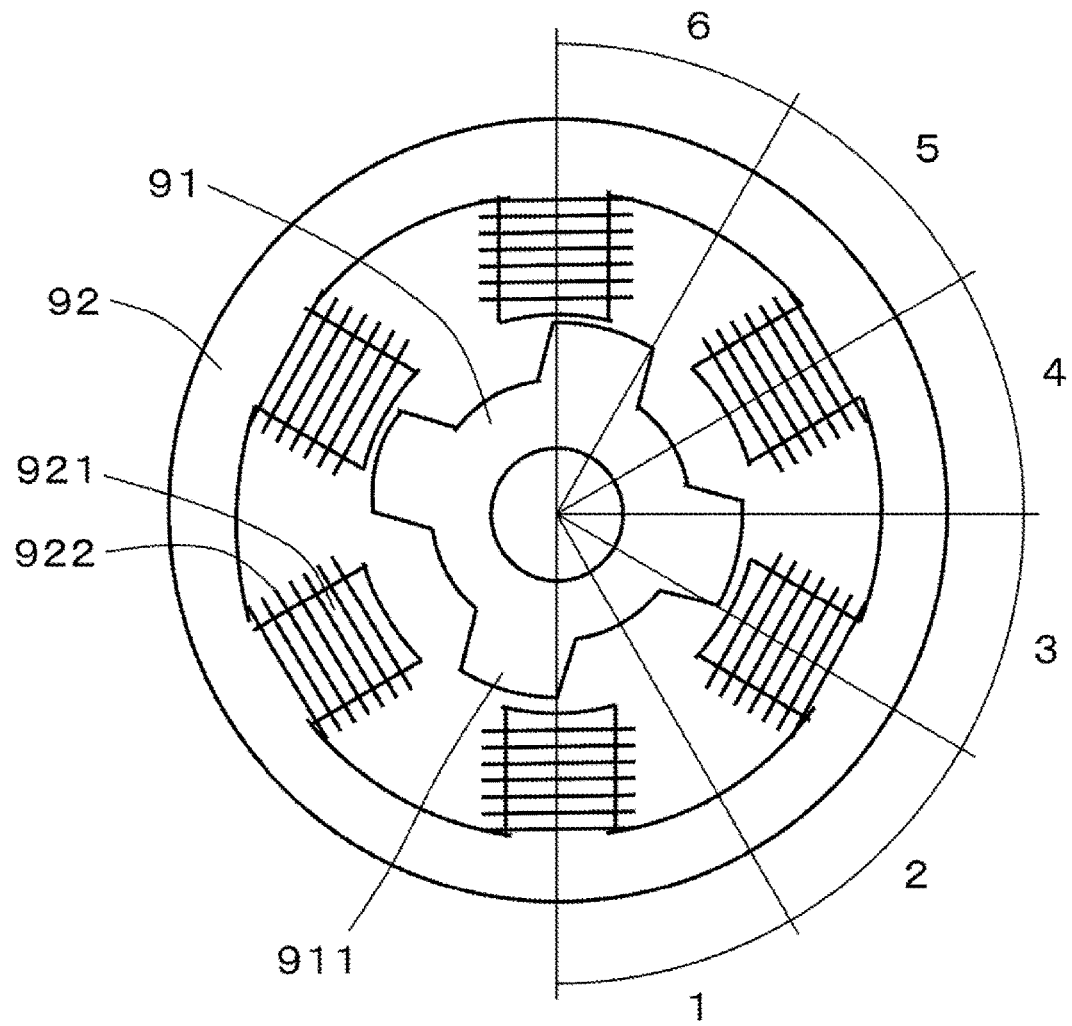
FIG. 7 is a view showing angular regions.

Next, the operation of the excitation forced turn-off part 231 will be described. FIG. 7 is a view showing the region between the protrusions 921 of the same phase in the stator 92 divided into six equal parts. While these regions basically match the above-described sectors, as there is a slight difference in purpose, these regions will be hereinafter expressed as angular regions. The rotor 91 rotates in the counterclockwise direction, and in FIG. 7, the numbers 1, 2, 3, 4, 5, and 6 are given to the regions from the protrusion 921 at the bottom. Hereinafter, with N being an integer from 1 to 6, the angular region of the number N will be referred to as angular region N. While the angular regions on the right half part are shown in FIG. 7, there are angular regions 1 to 6 in the left half part as well in the counterclockwise direction.

Table 3 shows the relation between the angular regions and the torques in the phases in the case where the DTC including the hysteresis control or the feedback control alone is adopted. The coils 922 at the bottom and the top in FIG. 7 are assumed to correspond to phase A. Hereinafter, these coils 922 will be referred to as coils of note.

TABLE 3

|  | Angular region number | | | | | |
| --- | --- | --- | --- | --- | --- | --- |
|  | 1 | 2 | 3 | 4 | 5 | 6 |
| Phase A | − | 0 | 0 | ↗ | + | ↘ |
| Phase B | + | ↘ | − | 0 | 0 | ↗ |
| Phase C | 0 | ↗ | + | ↘ | − | 0 |

In the SRM 9, when a current flows through the coil 922 of note, an attraction force acts between the protrusion 911 of the rotor 91 and the protrusion 921 of the stator 92. In the case of phase A, passing a current through the coil 922 of note in angular regions 4, 5, and 6 causes a positive phase torque to act on the rotor 91. Specifically, the phase torque rises in angular region 4, the phase torque temporarily exceeds a target value in angular region 5, and the phase torque decreases in angular region 6.

However, a slight attraction force may act between the protrusion 911 and the protrusion 921 in angular region 1, since the excitation of the coil 922 of note cannot be ended in an ideal manner immediately after the protrusion 911 has passed across the border between angular region 6 and angular region 1, that is, immediately after the protrusion 911 has passed by the protrusion 921. As a result, a negative phase torque acts on the rotor 91 in angular region 1. Of course, depending on the control method, the negative phase torque may be maintained up to angular region 2.

When the torque to be output by the SRM 9 is positive, that is, when the calculated torque or the reference torque of the SRM 9 as a whole is positive, the efficiency of the SRM 9 degrades due to generation of a negative phase torque in each phase. Therefore, when the calculated torque or the reference torque of the SRM 9 is positive, the excitation forced turn-off part 231 forcibly stops the current to phase A at least in angular region 1.

Of course, where it is necessary to prevent generation of a negative phase torque in angular region 2 as well, the excitation forced turn-off part 231 outputs a command voltage to the adder 232 for forcibly stopping the current to phase A in angular region 2 as well.

More specifically, the rotor angle θr is input in the excitation forced turn-off part 231, and a predetermined command voltage which indicates a negative voltage of the duty ratio of (−100)% is input into the adder 232 on the basis of a value input from the command voltage generation part 213.

As a result, after the current becomes zero, the current is kept at zero without flowing back, and the current flowing to phase A is forcibly stopped for a desired period of time. Of course, this description applies to the case of operation where the feedforward control is virtually not functioning, and the current does not always become zero while the feedforward control is functioning.

Similarly, when the excitation forced turn-off part 231 corresponds to phase B, the excitation forced turn-off part 231 outputs a command voltage for forcibly stopping the current to phase B in angular region 3, or angular regions 3 and 4. When the excitation forced turn-off part 231 corresponds to phase C, the excitation forced turn-off part 231 outputs a command voltage for forcibly stopping the current to phase C in angular region 5, or angular regions 5 and 6. The excitation forced turn-off part 231 prevents generation of a negative phase torque in each phase and improves the efficiency of the SRM 9.

While six angular regions are set in FIG. 7 for the convenience of control, the number of the angular regions is not limited to six. The number of the angular regions should be such that excitation is forcibly stopped at an angle at which a negative phase torque can occur. Although it is preferable that generation of a negative phase torque is prevented completely, complete prevention is not absolutely necessary. The excitation forced turn-off part 231 temporarily stops excitation in each phase at least immediately after the inductance changes from increase to decrease.

The number of the protrusions 921 of the stator 92 provided with the coil 922 and the number of the protrusions 911 of the rotor 91 are not limited to those shown in FIG. 7. Generally speaking, in the case of a three-phase concentrated wiring, the number of the protrusions 921 of the stator 92 provided with the coil 922 is 3n, and the number of the protrusions 911 of the rotor 91 is 2n, with n being a positive integer. In this case, the area in each phase from the angular position at which the inductance changes from increase to decrease to the angular position at which the inductance changes next from increase to decrease is divided into six equal angular regions. The excitation forced turn-off part 231 temporarily stops excitation, preferably at least in the first angular region. As shown in FIG. 7, if the numbers of the angular regions are assigned with reference to the protrusion 921 of the stator 92, the first angular region of phase A is angular region 1, the first angular region of phase B is angular region 3, and the first angular region of phase C is angular region 5.

It is not absolutely necessary that the excitation forced turn-off part 231 is provided immediately after the feedback computation part 21. For example, the excitation forced turn-off part 231 may be disposed between the adder 232 and the minimum magnetic flux maintenance part 233. Moreover, the excitation forced turn-off part 231 which changes the switching signal may be provided after the duty conversion part 234.

In the case where the feedback computation part 21 is omitted and the feedforward control alone is performed, a negative phase torque can be substantially prevented as well by using two-phase excitation. Thus, the feedforward computation part 22 substantially includes the function of the excitation forced turn-off part.

Figure 8:
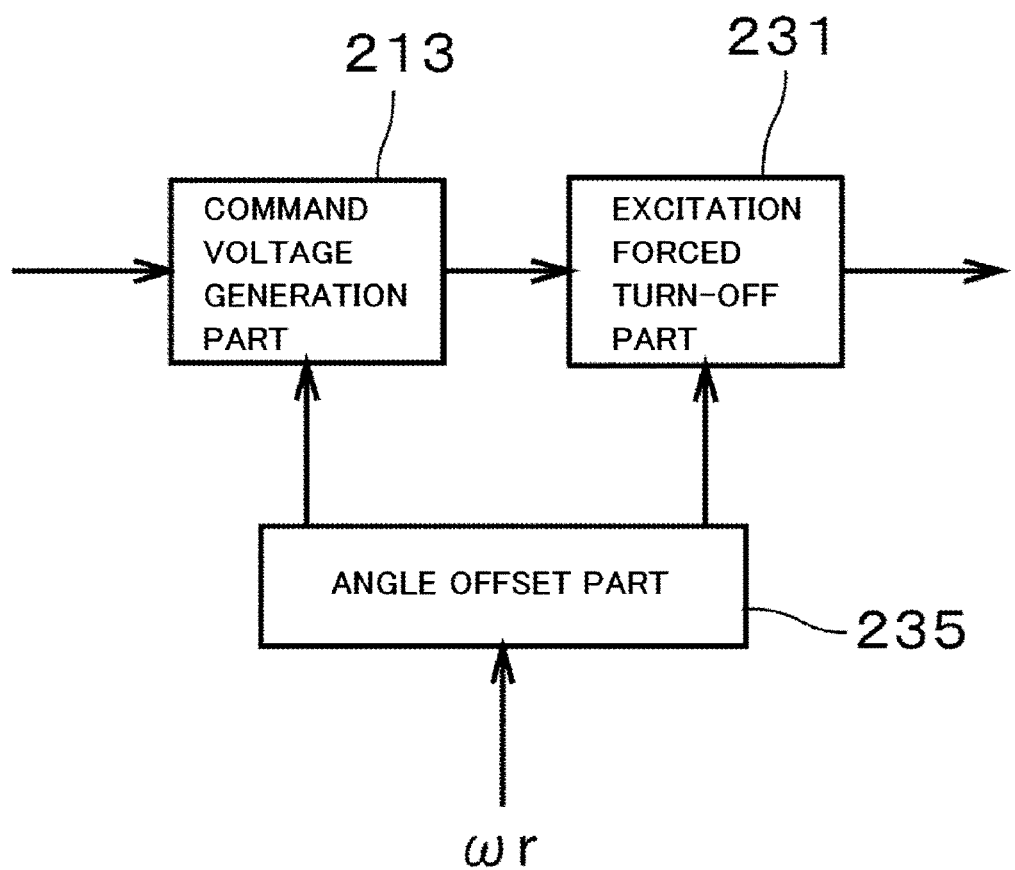
FIG. 8 is a view showing an angle offset part which is added to the switching control unit.

FIG. 8 is a view showing an example where an angle offset part 235 is added to the switching control unit 13. If the rotational speed of the SRM 9 becomes high, the current does not build up properly and the coil 922 is not excited at an ideal timing. As a result, in the case of phase A, sufficient torque is no longer obtained in angular region 4 of Table 3 where the magnetic flux increases. The angular region where the magnetic flux increases is angular region 6 in the case of phase B, and angular region 2 in the case of phase C. If the area in each phase from the angular position at which the inductance changes from increase to decrease to the angular position at which the inductance changes next from increase to decrease is divided into six equal angular regions, the angular region where the magnetic flux increases is the fourth angular region.

Therefore, when the rotational speed exceeds a predetermined value, the angle offset part 235 starts excitation by the switching control unit 13, in each phase from the middle of the third angular region. Thus, the torque during high-speed rotation is easily secured. While it is also acceptable to offset only the starting position of excitation in the clockwise direction, to facilitate the process, the angular offset part 235 shifts all the six angular regions in the clockwise direction, i.e., in the direction opposite to the rotation direction of the rotor 91, and thereby starts excitation from the middle of the third angular region. Specifically, the angular offset part 235 inputs the shift in the operation timing into the command voltage generation part 213 and the excitation forced turn-off part 231. Thus, the operation of the forced excitation turn-off part 231 is also accelerated, and delay of the timing of the excitation forced turn-off operation during high-speed rotation is also prevented.

Next, the operation of the minimum magnetic flux maintenance part 233 will be described. The rotational speed ωr of the SRM 9 is input into the minimum magnetic flux maintenance part 233. In the SRM 9, generally, the variation width of the magnetic flux narrows and the torque decreases during high-speed rotation. Therefore, the minimum magnetic flux maintenance part 233 changes the command voltage so as to maintain the minimum value of the magnetic flux during high-speed rotation. Accordingly, the inverter is controlled such that the calculated phase magnetic flux of each phase becomes equal to or higher than a predetermined minimum value in a state where the rotational speed ωr of the SRM 9 is above a predetermined speed. That is, the inverter is controlled in the continuous current mode. As a result, the torque during high-speed rotation is maintained.

The switching pattern in which the minimum value of the phase magnetic flux is maintained at a predetermined value is predetermined, and it is prepared in the minimum magnetic flux maintenance part 233 as a CCM table with the rotational speed ωr being a variable. Of course, a comparator which compares the phase magnetic flux and the minimum value may be used to control so as to maintain the minimum magnetic flux.

Figure 9:
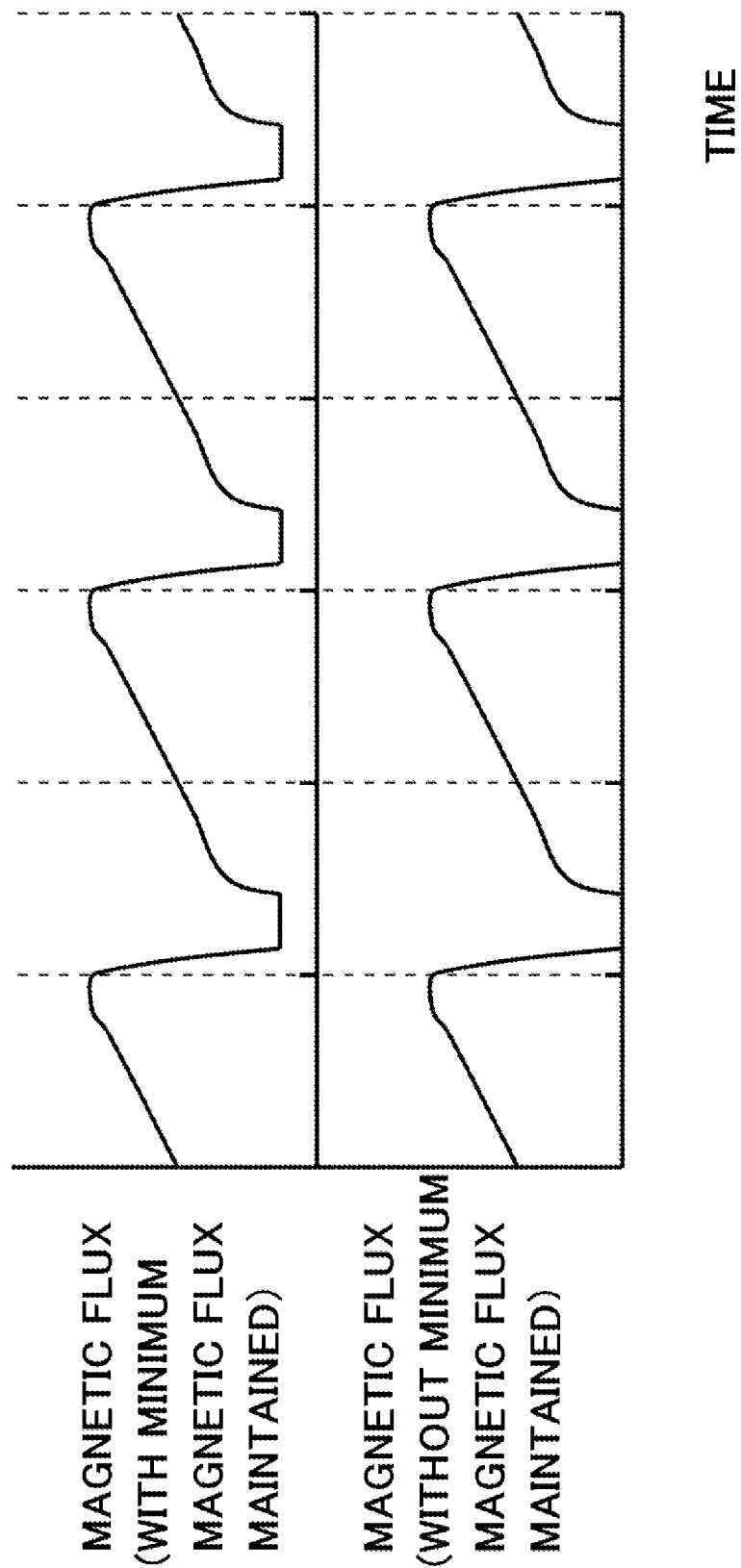
FIG. 9 is a view showing the operation of a minimum magnetic flux maintenance part.

FIG. 9 is a view showing the operation of the minimum magnetic flux maintenance part 233. The lower part of FIG. 9 illustrates changes in the phase magnetic flux in the case where the minimum magnetic flux is not maintained. The upper part of FIG. 9 shows changes in phase magnetic flux in the case where the minimum magnetic flux is maintained. When the minimum magnetic flux is maintained, the phase magnetic flux is raised as a whole, and a minimum value larger than zero is maintained. As a result, the variation width of the magnetic flux can be maintained, and torque decrease can be suppressed or prevented. The minimum magnetic flux maintenance part 233 realizes continuous current control through magnetic flux control. Thus, unlike the conventional continuous current control, it is not necessary to acquire the accurate rotor angle, and stable control is realized without depending on the detection accuracy of the rotor angle which is affected by assembly error etc. of a Hall element and the like.

Since the torque decrease in the SRM 9 becomes more significant as the rotational speed increases, it is preferable that the minimum value of the phase magnetic flux predetermined by the minimum magnetic flux maintenance part 233 is increased as the rotational speed of the SRM 9 increases. Thus, the torque is maintained efficiently.

In the switching control unit 13, the minimum magnetic flux maintenance part 233 is provided on the downstream side of the excitation forced turn-off part 231, that is, on the inverter 11 side. Therefore, even when the command voltage is generated in the excitation forced turn-off part 231 such that the current becomes temporarily zero, if the minimum magnetic flux maintenance part 233 functions, the command voltage is corrected such that the current does not become zero. Thus, the operation of the minimum magnetic flux maintenance part 233 is given priority over the operation of the excitation forced turn-off part 231 in the control of each phase performed by the switching control unit 13. In other words, the minimum magnetic flux maintenance part 233 maintains the torque during high-speed rotation while allowing the torque of each phase to become temporarily negative.

Figure 10:
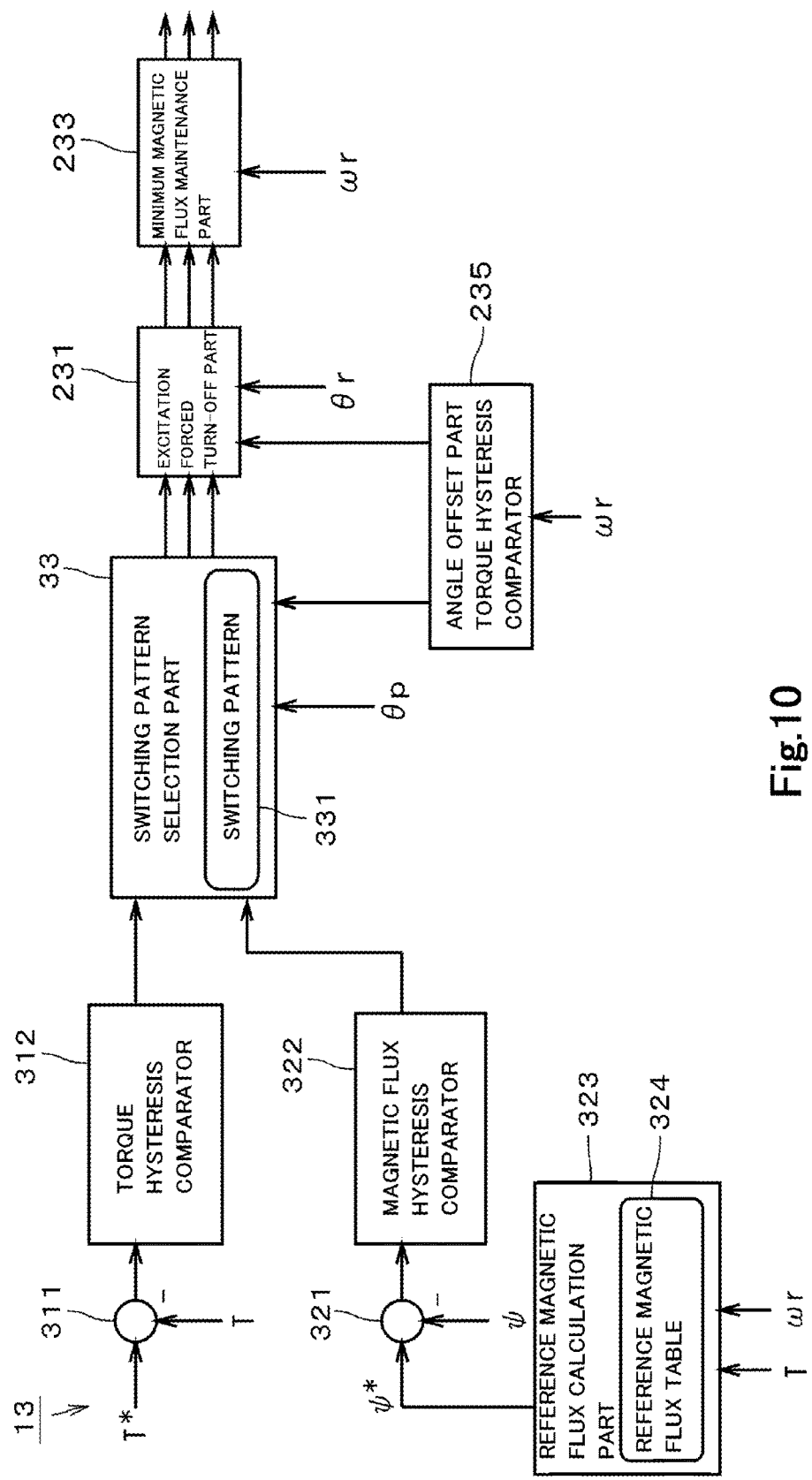
FIG. 10 is a view showing another example of the switching control unit.

FIG. 10 is a view showing another example of the switching control unit 13. In the example of FIG. 10, the SRM 9 is controlled by the DTC.

The switching control unit 13 includes a torque differentiator 311, a torque hysteresis comparator 312, a magnetic flux differentiator 321, a magnetic flux hysteresis comparator 322, a reference magnetic flux calculation part 323, a switching pattern selection part 33, the excitation forced turn-off part 231, the minimum magnetic flux maintenance part 233, and the angle offset part 235.

The switching pattern selection part 33 selects a switching pattern, to be applied to the inverter 11, from a plurality of switching patterns prepared therein. The torque differentiator 311 obtains the difference between the calculated torque T and the reference torque T*, and inputs the difference into the torque hysteresis comparator 312. For example, the reference torque T* is obtained by a computer (not shown) as a torque for bringing the rotational speed of the rotor 91 to a target speed. The torque hysteresis comparator 312, while giving hysteresis, gives the sign of the difference between the calculated torque T and the reference torque T* to the switching pattern selection part 33.

The magnetic flux differentiator 321 obtains the difference between the calculated magnetic flux ψ and a reference magnetic flux ψ*. The calculated magnetic flux ψ is a combination of the three phase magnetic fluxes ψp, and the phase magnetic fluxes ψp may be obtained in the magnetic flux computation part 122, or a computation part for combining the phase magnetic fluxes ψp may be separately provided. The reference magnetic flux ψ* is obtained in the reference magnetic flux calculation part 323. The reference magnetic flux calculation part 323 stores a reference magnetic flux table 324. In the reference magnetic flux table 324, the calculated torque T and the rotational speed ωr are associated with the reference magnetic flux ψ*. The reference magnetic flux calculation part 323 specifies the reference magnetic flux ψ* with reference to the calculated torque T and the rotational speed ωr, and inputs the reference magnetic flux ψ* into the magnetic flux differentiator 321.

The difference between the calculated magnetic flux ψ and the reference magnetic flux ψ* is input into the magnetic flux hysteresis comparator 322. The magnetic flux hysteresis comparator 322, while giving a predetermined hysteresis, gives the sign of the difference between the calculated magnetic flux ψ and the reference magnetic flux ψ* to the switching pattern selection part 33.

The torque hysteresis comparator 312 is a binary hysteresis comparator. The torque hysteresis comparator 312 outputs "1" if the (signed) difference between the reference torque T* and the calculated torque T is larger than a predetermined positive threshold value, and outputs "−1" if the difference is smaller than a predetermined negative threshold value. If the difference is between the positive threshold value and the negative threshold value, the torque hysteresis comparator 312 maintains the output of "1" or "−1" which is the preceding state. The magnetic flux hysteresis comparator 322 is also a binary hysteresis comparator. The magnetic flux hysteresis comparator 322 outputs "1" if the (signed) difference between the reference magnetic flux ψ* and the calculated magnetic flux ψ is larger than a predetermined positive threshold value, and outputs "−1" if the difference is smaller than a predetermined negative threshold value. If the difference is between the positive threshold value and the negative threshold value, the magnetic flux hysteresis comparator 322 maintains the output of "1" or "−1" which is the preceding state.

The values output from the torque hysteresis comparator 312 and the magnetic flux hysteresis comparator 322, i.e., the result of comparison between the reference torque T* and the calculated torque T and the result of comparison between the reference magnetic flux ψ* and the calculated magnetic flux ψ, are input into the switching pattern selection part 33. While not shown in FIG. 1, the torque/magnetic flux computation unit estimates or measures a magnetic flux phase angle θp by computation, and inputs the magnetic flux phase angle θp into the switching pattern selection part 33. On the basis of these input values, the switching pattern selection part 33 selects one switching pattern from a plurality of switching patterns 331 and outputs a signal indicating this selected pattern.

Table 4 is a table used for selecting a switching pattern. In the column of the torque T in Table 4, the symbol ↑ indicates that the value input from the torque hysteresis comparator 312 into the switching pattern selection part 33 is "1". That is, the symbol ↑ indicates the case where the magnetic flux vector is rotated in the counterclockwise direction in the SRM 9 to increase the torque in the counterclockwise direction. The symbol ↓ indicates that the input value is "−1", and indicates the case where the magnetic flux vector is rotated in the clockwise direction in the SRM 9 to reduce the torque in the counterclockwise direction.

TABLE 4

| T | ψ | n |
|---|---|---|
| ↑ | ↓ | K + 2 |
| ↑ | ↑ | K + 1 |
| ↓ | ↑ | K − 1 |
| ↓ | ↓ | K − 2 |

In the column of the magnetic flux ω, the symbol ↑ indicates that the value input from the magnetic flux hysteresis comparator 322 into the switching pattern selection part 33 is "1". That is, the symbol ↑ indicates the case where the magnetic flux generated in the SRM 9 is increased. The symbol ↓ indicates that the input value is "−1", and indicates the case where the magnetic flux is reduced.

Figure 11:
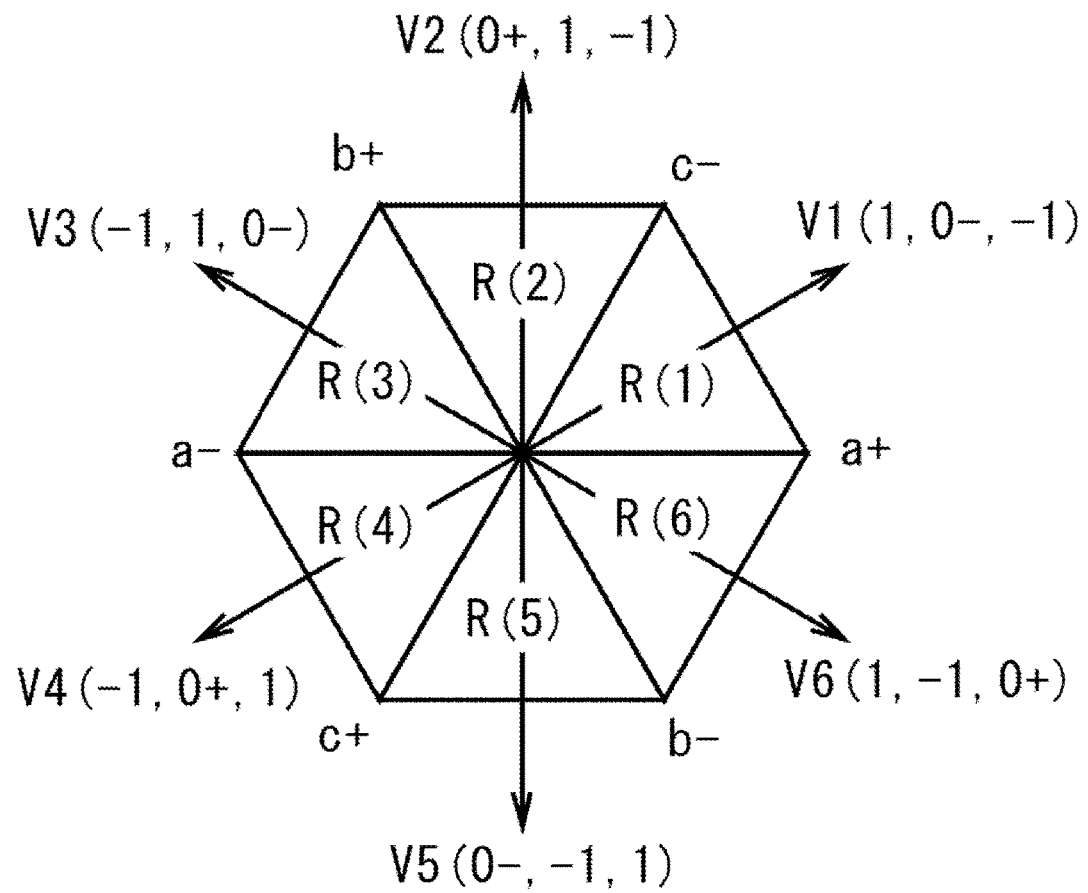
FIG. 11 is a view showing the relation between a magnetic flux phase angle and K.

In Table 4, n is the number of the switching pattern to be set in the inverter 11. The number n is determined by assigning a value, which indicates the range of the magnetic flux phase angle θp, to K. FIG. 11 is a view showing the relation between the magnetic flux phase angle θp and K. The range indicated by the reference sign R(1) indicates the range of the magnetic flux phase angle θp in the case where 1 is assigned to K. Similarly, the reference signs R(2), R(3), and so on to R(6) indicate the ranges in the cases where 2, 3, and so on to 6, respectively, are assigned to K. If (K+2) or (K+1) exceeds 6, a value obtained by subtracting 6 from that value is set as n. If (K−1) or (K−2) is smaller than 1, a value obtained by adding 6 to that value is set as n.

Figure 12:
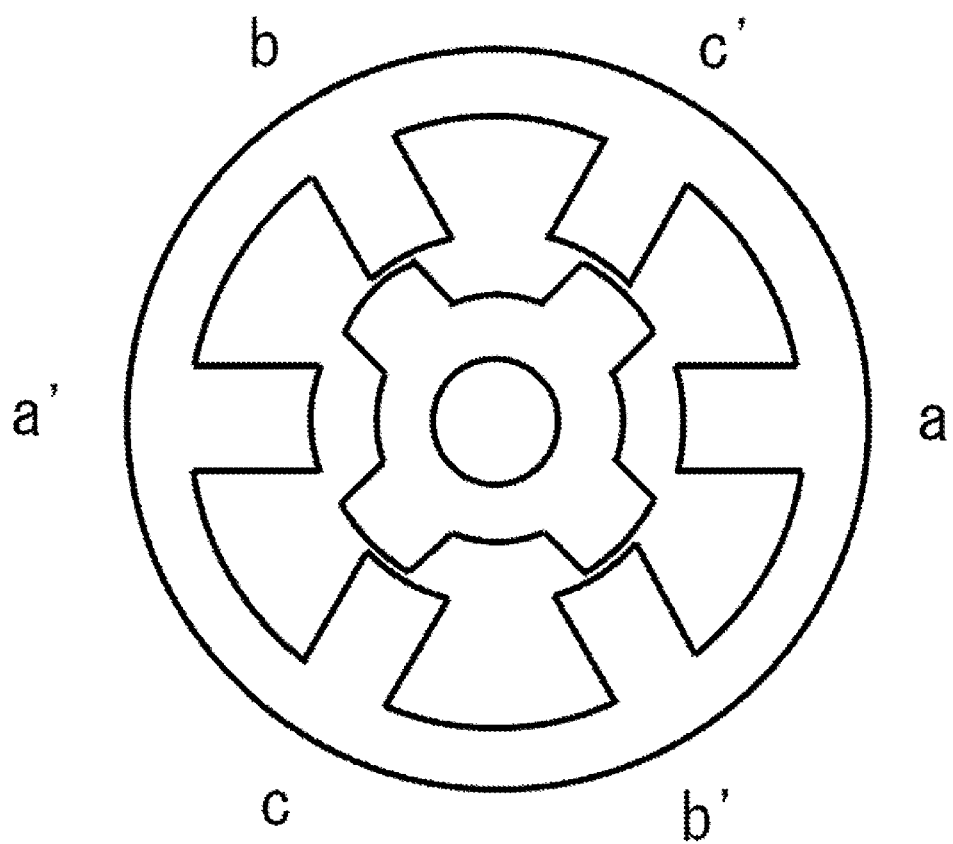
FIG. 12 is a view showing the positions of coils of phases corresponding to the directions of magnetic fluxes.

FIG. 12 is a view showing the positions of the coils 922 of the phases corresponding to the directions of magnetic fluxes a, b, and c shown in FIG. 11. In FIG. 12, the direction from a' toward a corresponds to the direction from (a−) toward (a+) in FIG. 11. The direction from b' toward b corresponds to the direction from (b−) toward (b+) in FIG. 11, and the direction from c' toward c corresponds to the direction from (c−) toward (c+) in FIG. 11.

When n is determined by the switching pattern selection part 33 on the basis of the values from the torque hysteresis comparator 312 and the magnetic flux hysteresis comparator 322, the magnetic flux phase angle θp, and Table 4, a switching pattern of the inverter 11 which realizes a voltage vector Vn (La, Lb, Lc) is selected. The symbols La, Lb, Lc correspond to the coil groups of the three phases. The voltage vector Vn (La, Lb, Lc) corresponds to one of the voltage vectors shown in FIG. 11, V1 (1, 0−, −1), V2 (0+, 1, −1), and so on to V6 (1, −1, 0+), and "1", "0", or "−1" is set to La, Lb, and Lc according to the value of n. The number "1" indicates that a voltage in the forward direction is applied to the corresponding coil group; "−1" indicates that a voltage in the reverse direction is applied; and "0+" and "0−" indicate that both ends of the coil group assume the potential of the positive pole or the negative pole of the power source 114.

For example, if the value input from the torque hysteresis comparator 312 is "1", the value input from the magnetic flux hysteresis comparator 322 is "−1" and the magnetic flux phase angle θp is within the range R(1), "1" is assigned to K, and, from the top row of Table 4, n is set to (K+2), i.e., 3. Thus, a switching pattern is set in which a voltage is applied to a wire connected with the coil 922 in the inverter 11 such that the voltage vector matches V3 (−1, 1, 0−) of FIG. 11. Since the magnetic flux vector from the origin is expressed as the integral of the voltage vector, the terminal end of the magnetic flux vector located in the range R(1) moves toward V3 in FIG. 11. As a result, the torque increases and the magnetic flux decreases.

In another example, if the value input from the torque hysteresis comparator 312 is "−1", the value input from the magnetic flux hysteresis comparator 322 is "1", and the magnetic flux phase angle θp is within the range R(3), "3" is assigned to K, and, from the third row of Table 4, n is set to (K−1), i.e., 2. Thus, a switching pattern is selected in which a voltage is applied to a wire connected with the coil 922 in the inverter 11 such that the voltage vector matches V2 (0+, 1, −1) of FIG. 11. The terminal end of the magnetic flux vector located in the range R(3) moves toward V2 in FIG. 11, so that the torque decreases and the magnetic flux increases.

As the switching pattern of the inverter 11 is thus selected in the switching pattern selection part 33, the torque and the magnetic flux are controlled, and the SRM 9 is controlled such that the calculated torque T and the calculated magnetic flux ψ follow the reference torque T* and the reference magnetic flux ψ*. For example, in the reference magnetic flux calculation part 323, the reference magnetic flux ψ* is obtained such that the magnetic flux trajectory, which is the trajectory drawn by the terminal end of the magnetic flux vector, becomes a circle. When the excitation forced turn-off part 231 functions, the actual magnetic flux trajectory does not become a circle. Of course, the magnetic flux trajectory set by the reference magnetic flux calculation part 323 is not limited to a circle.

In the switching control unit 13 of FIG. 10, the excitation forced turn-off part 231 and the minimum magnetic flux maintenance part 233 are sequentially connected with the switching pattern selection part 33. The minimum magnetic flux maintenance part 233 is connected with the inverter 11. In FIG. 10, the excitation forced turn-off parts 231 and the minimum magnetic flux maintenance parts 233 for the three phases are each collectively indicated in one block. The functions of the excitation forced turn-off part 231 and the minimum magnetic flux maintenance part 233 are the same as those described with reference to FIG. 4, except that a correction is made to a signal from the switching pattern selection part 33.

That is, when the calculated torque or the reference torque of the SRM 9 is positive, the excitation forced turn-off part 231 temporarily stops excitation in each phase immediately after at least the inductance has changed from increase to decrease. The minimum magnetic flux maintenance part 233 controls the inverter 11 such that the calculated phase magnetic flux of each phase becomes equal to or larger than a predetermined minimum value in a state where the rotational speed of SRM 9 is above a predetermined speed. In the control of each phase, the operation of the minimum magnetic flux maintenance part 233 is given priority over the operation of the excitation forced turn-off part 231.

The angle offset part 235 is connected with the switching pattern selection part 33 and the excitation forced turn-off part 231. As described with reference to FIG. 8, when the rotational speed exceeds a predetermined value, the angle offset part 235 starts excitation by the switching control unit 13, in each phase from the middle of the above-described third angular region.

The entire description having been made with reference to FIG. 4 regarding the excitation forced turn-off part 231, the minimum magnetic flux maintenance part 233, and the angle offset part 235 applies to the switching control unit 13 of FIG. 10.

Various modifications can be made to the above-described motor controller 1.

For example, the excitation forced turn-off part 231 or the minimum magnetic flux maintenance part 233 can be adopted for other control methods as well.

While six sectors and angular regions are set with reference to the stator 92 in the above preferred embodiment, the sectors and angular regions may be set with reference to the protrusion 911 of the rotor 91, and the control may be performed on the basis of these sectors and angular regions. If the number of the protrusions 911 is four, six sectors and six angular regions are the ranges obtained by dividing the range of 90 degrees into six equal parts.

In the motor controller 1, while it is preferable that the inverter 11 shown in the above preferred embodiment is used, an inverter including another structure may be used.

Where appropriate, details of the DTC may also be modified. For example, the output of the torque hysteresis comparator 312 may be ternary.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The present disclosure can be used for controlling switched reluctance motors intended for various purposes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor controller which controls a switched reluctance motor, the motor controller comprising:
   an inverter connected with a three-phase concentrated winding switched reluctance motor;
   a torque computation part which estimates or measures, as a calculated torque, a torque generated in the switched reluctance motor on the basis of an output from the inverter and a rotor angle of the switched reluctance motor;
   a magnetic flux computation part which estimates or measures, as a calculated phase magnetic flux, a phase magnetic flux of each phase generated in the switched reluctance motor on the basis of the output from the inverter and the rotor angle of the switched reluctance motor; and
   a switching control unit which controls the inverter by using at least a reference torque, which is a torque command value, and the calculated torque, wherein
   the switching control unit includes a minimum magnetic flux maintenance part,
   the minimum magnetic flux maintenance part controls the inverter such that the calculated phase magnetic flux of each phase becomes equal to or larger than a predetermined minimum value in a state where a rotational speed of the switched reluctance motor is above a predetermined speed,
   the predetermined minimum value is increased as the rotational speed of the switched reluctance motor increases, and
   the three-phase concentrated winding switched reluctance motor has a double salient pole structure with a rotor including a plurality of protrusions protruding toward a stator, and the stator includes a plurality of protrusions protruding toward the rotor.

2. The motor controller according to claim 1, wherein
   the switching control unit includes an excitation forced turn-off part,
   when the calculated torque or the reference torque of the switched reluctance motor is positive, the excitation forced turn-off part temporarily stops excitation in each phase immediately after at least the inductance has changed from increase to decrease, and
   in the control of each phase, operation of the minimum magnetic flux maintenance part is given priority over operation of the excitation forced turn-off part.

* * * * *